Nov. 23, 1926.  L. D. ACKLEY  1,607,935
FAUCET VALVE
Filed March 5, 1926
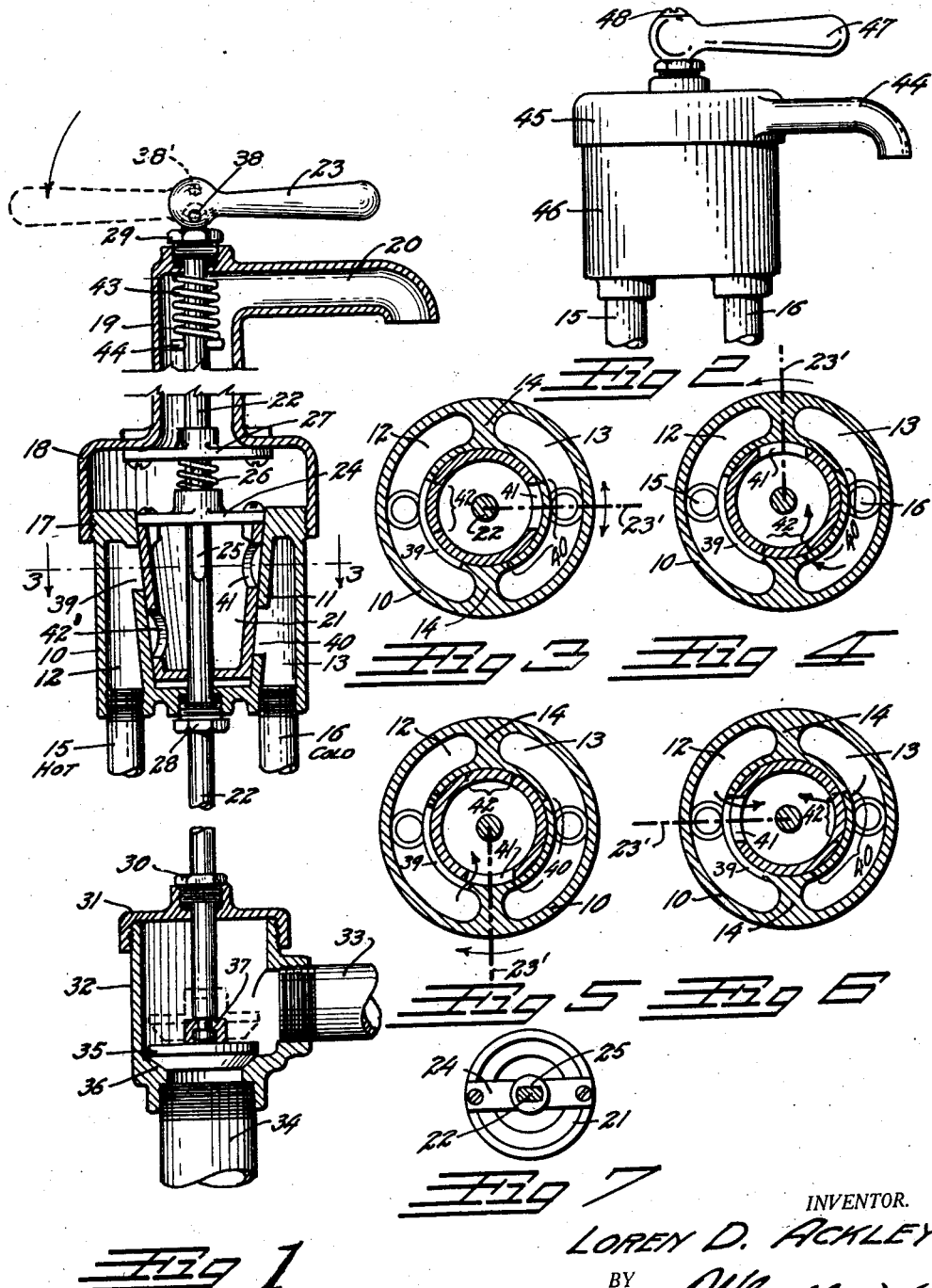
INVENTOR.
LOREN D. ACKLEY
BY
ATTORNEY.

Patented Nov. 23, 1926.

1,607,935

UNITED STATES PATENT OFFICE.

LOREN D. ACKLEY, OF LIMON, COLORADO.

FAUCET VALVE.

Application filed March 5, 1926. Serial No. 92,475.

This invention relates to a valve or faucet for use with plumbing fixtures of various kinds, and has for its principal object the provision of a simple, efficient, and positively operating valve, by means of which both the hot and cold water supplies may be controlled by a single operating handle and in which the water is delivered through a single outlet at any desired temperature.

Another object is to so construct the above faucet that it will also operate the waste pipe regardless of the position of the valve, thus, in a lavatory or bath tub, all control of the water to and from the bowl is accomplished through a single handle.

Other objects and advantages reside in the detail construction of the invention, which is designed for simplicity, economy and efficiency. These will become more apparent from the following description.

In the following detailed description of the invention reference is had to the accompanying drawing which forms a part hereof. Like numerals refer to like parts in all views of the drawing and throughout the description.

Fig. 1 is a vertical cross section through the improved supply valve combined with the waste valve.

Fig. 2 is a side elevation of a valve for use independently of the waste pipe.

Figs. 3, 4, 5 and 6 are detail views, each illustrating a section through the supply valve, taken on the line 3—3, Fig. 1. These detail views illustrate the position of the valve at differing positions of the operating handle. In each of these views, the position of the operating handle is indicated by the broken line 23'.

Fig. 7 is a detail plan view of the valve.

The invention comprises a valve housing 10, surrounding a tapered cylindrical valve seat 11. Arranged at each side, between the valve seat 11 and the walls of the housing 10, is a hot water chamber 12, and a cold water chamber 13, separated by means of partitions 14. The chambers 12 and 13 are supplied by means of hot and cold water supply pipes 15 and 16 respectively, which open to the bottom of the chambers 12 and 13. Threaded to the top of the housing 10, as shown at 17, is a cap 18 carrying a riser pipe 19, terminating in a spout 20.

A hollow, open-topped, conical valve 21 rests within the valve seat 11. The valve 21 is rotated by means of a valve shaft 22 terminating at its upper extremity in an operating handle 23. The operating shaft 22 passes through a bridge 24 secured to the upper edges of the valve 21. The shaft at this point is provided with flattened sides 25 which engage a correspondingly shaped opening in the bridge 24, as indicated in Fig. 7, so as to allow the shaft 22 to move vertically in the bridge 24, but cause it to rotate therewith. The valve 21 is held against its seat by a spring 26 which is compressed between the bridge and a guide 27 through which the valve shaft 22 passes. The valve shaft 22 extends from the bottom of the housing 10 through a packing gland 28 and through the upper extremity of the riser pipe, through a similar packing gland 29.

The riser pipe 19 may be of any desired length so as to allow the spout 20 and the supply valve to be placed at convenient positions on the fixture.

The lower extremity of the valve shaft 22 passes through a packing nut 30, carried in a waste pipe 31, threaded onto a waste housing 32. A waste pipe 33, from the fixture, opens into the side of the housing 32, and a sewer pipe 34 opens from the bottom thereof. A plug 35 is carried upon the lower extremity of the valve shaft 22, and fits against a seat 36 so as to close the discharge to the sewer pipe 34. The plug 35 rides in a groove 37 in the shaft, so that the shaft may rotate independent of the plug. The plug 35 is lifted from its seat, when desired, by moving the operating handle 23 in a vertical arc, to the broken line position of Fig. 1. This is accomplished by pivoting the upper extremity of the valve shaft 22 eccentric of the operating handle 23, as indicated at 38. This pivot point will move to the broken line 38' when the handle is in the broken line position, thus resulting in raising the plug 35 a distance equal to twice the eccentricity of the pivot 38. The plug 35 is returned and maintained against its seat by a spring 43 which acts against a pin 44 to force the valve shaft 22 downward.

It is desired to call attention to the fact that the operating handle 23 may swing in its vertical arc at any radial position around the shaft 22 so that the waste plug may be opened, regardless of the position of the valve 21.

Formed in the valve seat 11, are oppositely placed ports 39 and 40. These ports are placed at differing elevations to coincide with openings 41 and 42 respectively, formed at differing elevations in the valve 21. The water flows from the valve 21 through its open top and through the riser pipe 19, discharging from the spout 20. In Fig. 3, the valve is illustrated in the closed position. The openings 41 and 42 are on opposite sides of the valve seat from their respective ports 39 and 40. Let us assume that the operating handle 23 is turned to the position of Fig. 4. The opening 42 will now partially uncover the port 40, allowing cold water to flow to the valve interior. If the operating handle be turned in the opposite direction, to the position of Fig. 5, the upper opening 41 will partially uncover the hot water port 39, allowing hot water to flow from the hot water compartment, 12, to the interior of the valve.

Should the operating handle be moved further toward the rear from either of the views 4 or 5, it will increase the flow of either the hot or cold water. Continued movement in this direction, past the maximum flow point, will begin to uncover both the hot and cold water ports 39 and 40, until at the position of Fig. 6, both of these ports will be at their maximum opening. This arrangement allows either kind of water or any desired mixture of both to be obtained from the valve.

In Fig. 2, I have illustrated an embodiment of the valve with the drain plug arrangement. The supply valve in this form is similar to that previouly described, but the valve shaft does not extend through the bottom of the housing 10. In this from, however, a spout 44 is formed directly upon a cap 45 which covers the valve housing 46. The operating handle in this form, designated by the numeral 47, does not need a vertical arc movement and is secured in any desired manner, as by a screw 48, to the valve shaft.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A faucet comprising, a housing; a cylindrical valve seat in said housing; hot and cold water chambers adjacent said valve seat; an open topped cylindrical valve in said seat arranged to uncover ports in said chambers; a valve shaft passing axially through said valve, a flattened surface on said shaft; a bridge extending across the open top of said valve and arranged to engage said flattened surface on said valve shaft so as to allow said valve to move longitudinally on but rotate with said shaft; and a spring acting to force said valve along said shaft.

2. A faucet and drain device comprising a cylindrical housing; a conical valve seat concentrically arranged within said housing; partitions between said housing and said valve seat dividing the former into hot and cold water compartments; ports communicating between said compartments and the interior of said valve seat, the ports of opposite compartments being at different elevations; and a hollow-open-topped valve arranged to be rotated in said valve seat, said valve having openings at different elevations so as to register with one or more of said ports.

3. A faucet and drain device comprising a cylindrical housing; a conical valve seat concentrically arranged within said housing; partitions between said housing and said valve seat dividing the former into hot and cold water compartments; ports communicating between said compartments and the interior of said valve seat, the ports of opposite compartments being at different elevations; a hollow-open-topped valve arranged to be rotated in said valve seat, said valve having openings at differing elevations so as to register with one or more of said ports; a shaft axially arranged in said valve and extending above and below said housing; a bridge over said valve arranged to cause said valve to rotate with said shaft and allow the former to move longitudinally on the latter; and a spring surrounding said shaft and compressed between said bridge and said housing so as to force said valve along said shaft against its seat.

4. A faucet and drain device comprising a cylindrical housing; a conical valve seat concentrically arranged within said housing; partitions between said housing and said valve seat dividing the former into hot and cold water compartments; ports communicating between said compartments and the interior of said valve seat, the ports of opposite compartments being at different eletions; a hollow open-topped valve arranged to be rotated in said valve seat, said valve having openings at differing elevations so as to register with one or more of said ports; a shaft axially arranged in said valve and extending above and below said housing; a bridge over said valve arranged to cause said valve to rotate with said shaft and allow the former to move longitudinally on the latter; a spring surrounding said shaft and compressed between said bridge and said housing so as to force said valve along said shaft against its seat; a plug carried at the lower extremity of said shaft and adapted to cut off a waste passage; and a second spring arranged between said housing and a projection on said shaft so as to force said shaft and plug downwardly through said valve.

In testimony whereof, I affix my signature.

LOREN D. ACKLEY.